(12) United States Patent
Petit et al.

(10) Patent No.: US 9,193,296 B2
(45) Date of Patent: Nov. 24, 2015

(54) MOTOR VEHICLE DRIVING ASSISTANCE METHOD WITH A VIEW TO OPTIMIZING THE USE OF THE POWER SUPPLY

(75) Inventors: Clement Petit, Paris (FR); Yann Chazal, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 179 days.

(21) Appl. No.: 14/128,444

(22) PCT Filed: Jun. 19, 2012

(86) PCT No.: PCT/FR2012/051370
§ 371 (c)(1),
(2), (4) Date: Mar. 11, 2014

(87) PCT Pub. No.: WO2012/175857
PCT Pub. Date: Dec. 27, 2012

(65) Prior Publication Data
US 2014/0203927 A1    Jul. 24, 2014

(30) Foreign Application Priority Data
Jun. 21, 2011  (FR) ...................................... 11 55431

(51) Int. Cl.
*G06F 17/00*   (2006.01)
*B60Q 1/00*    (2006.01)
(Continued)

(52) U.S. Cl.
CPC ... *B60Q 1/00* (2013.01); *B60L 3/12* (2013.01); *B60L 15/2045* (2013.01); *B60R 16/0236* (2013.01); *B60W 40/09* (2013.01);
(Continued)

(58) Field of Classification Search
CPC .......................... B60R 16/0236; B60W 40/09
USPC ..................................... 340/438, 439; 701/22
See application file for complete search history.

(56) References Cited

U.S. PATENT DOCUMENTS

| 4,570,226 | A | 2/1986 | Aussedat |
| 8,362,891 | B2 * | 1/2013 | Schumann et al. ........... 340/438 |

(Continued)

FOREIGN PATENT DOCUMENTS

| DE | 196 12 062 | 10/1997 |
| DE | 101 38 750 | 2/2003 |

(Continued)

OTHER PUBLICATIONS

International Search Report Issued Oct. 1, 2012 in PCT/FR12/051370 Filed Jun. 19, 2012.

*Primary Examiner* — Brent Swarthout
(74) *Attorney, Agent, or Firm* — Oblon, McClelland, Maier & Neustadt, L.L.P.

(57) ABSTRACT

A motor vehicle driving assistance method including at least one electric motor powered by a battery and capable of driving drive wheels of the vehicle, the method including calculating an optimized consumption for the vehicle from an actual power consumption of the vehicle and from values collected by sensors of the vehicle, over a same path that the vehicle is in a process of traveling, the optimized consumption corresponding to a reference driving style; and informing the driver of a distance that he/she could travel using the power supply available on-board the vehicle if he/she were to adopt the reference driving style, or else the driver is informed of energy savings per unit of distance traveled that he/she might obtain if the reference driving style were adopted.

14 Claims, 1 Drawing Sheet

(51) Int. Cl.
*B60R 16/023* (2006.01)
*B60W 40/09* (2012.01)
*B60W 50/14* (2012.01)
*B60L 3/12* (2006.01)
*B60L 15/20* (2006.01)
*B60W 50/00* (2006.01)

(52) U.S. Cl.
CPC ....... *B60W 50/14* (2013.01); *B60K 2350/1092* (2013.01); *B60L 2240/12* (2013.01); *B60W 2050/0089* (2013.01); *B60W 2510/244* (2013.01); *B60W 2510/305* (2013.01); *B60W 2520/10* (2013.01); *B60W 2530/14* (2013.01); *Y02T 10/7283* (2013.01)

(56) References Cited

U.S. PATENT DOCUMENTS

2011/0307130 A1* 12/2011 Gow et al. ........................ 701/22
2013/0179007 A1* 7/2013 Dalum ............................. 701/2

FOREIGN PATENT DOCUMENTS

| EP | 0 076 764 | 4/1983 |
| EP | 2 011 696 | 1/2009 |
| WO | 03 086786 | 10/2003 |

\* cited by examiner

MOTOR VEHICLE DRIVING ASSISTANCE METHOD WITH A VIEW TO OPTIMIZING THE USE OF THE POWER SUPPLY

The subject of the invention is a device for aiding the driving of a vehicle, and in particular an electric propulsion vehicle. The subject of the invention is also a vehicle whose onboard computer is configured to implement such a method.

The range of an electric vehicle being substantially more restricted than that of a vehicle equipped with a combustion engine, it is important to take into account all the factors which make it possible to improve this range, and in particular the driver's driving style.

In order to allow the driver to plan his journey as a function of the foreseeable residual range of the vehicle, various procedures for estimating the range are proposed, which take into account the topology of the road or optionally the style of the driver.

Patent application KR 10025 44 26 proposes for example to estimate the state of charge (SOC) of the battery, and to average the consumption of the vehicle so as to obtain, by extrapolation, the residual range of the vehicle.

Patent application KR 10025 67 49 proposes furthermore to use the information from various sensors to qualify the driver's driving style, and to adapt the computation of the range to the driving style detected.

Patent application DE 103 02 504 proposes to combine information obtained by the sensors of the vehicle and information obtained for example by GPS charts, or by other databases detailing the characteristics of the roads to be traveled, so as to evaluate, as a function of various types of driving of the driver, the residual range or the range over a provisional journey that the driver is getting ready to make.

These devices for estimating the vehicle's range therefore endeavor to characterize the driver's mode of driving, so as to improve the reliability of the computed range.

These systems allow the driver to adapt his mode of driving so as to increase the actual range of the vehicle. The device of DE 103 02 504 would make it possible for example to compare, before making a journey, the range of the vehicle over this journey according to a predefined economical mode of driving and according to a predefined sports mode of driving.

However neither of these two modes of driving corresponds a priori exactly to the actual mode of driving that the driver will adopt. Furthermore, the prospective estimation of the two ranges over the envisaged journey requires numerous data on the topology of the journey to be made, which data are more or less exact, and more or less available.

The objective of the invention is to propose a system for aiding driving which allows the driver to evaluate the gain in terms of range that he could obtain if he adapted his mode of driving to a "standard optimized" economical mode of driving. The range computations performed for this purpose will have to take best possible account of the driver's actual driving style.

The evaluation system must be capable of computing the range on the basis of the data arising solely from the sensors of the vehicle, without the evaluation system necessarily employing a database on the topology of the roads to be traveled shortly.

To this end a method is proposed for aiding driving of an automotive vehicle comprising at least one electric motor supplied by a battery and able to propel drive wheels of the vehicle. In this method an optimized consumption of the vehicle over the same journey as the vehicle is in the process of making is computed on the basis of the actual energy consumption of the vehicle and of values collected by sensors of the vehicle, the optimized consumption corresponding to a reference driving style, and the driver is informed of the distance that he could travel with the energy reserve available aboard the vehicle if he adopted the reference driving style, or else the driver is informed of the energy saving per unit distance traveled that he could achieve if he adopted the reference driving style.

According to a preferred mode of implementation of this method, an overconsumption or mean energy consumed in excess by the vehicle is computed over a time period or over a predefined journey length, and then an optimized consumption is computed by subtracting the overconsumption from the energy actually consumed by the vehicle. The overconsumption or mean excess energy corresponding to an average of energy per km consumed in excess with respect to the reference driving mode. The optimized consumption is also, preferably, a value per unit distance traveled. One remains of course within the framework of the invention if one begins by subtracting an instantaneous excess energy from the instantaneous energy consumed by the vehicle, and then the difference is integrated or filtered to obtain a value of mean optimized consumption.

Advantageously an instantaneous excess power or energy is determined initially, on the basis of which is computed the mean excess energy, the instantaneous excess power or energy being computed on the basis of parameters comprising the instantaneous speed of the vehicle, the power drawn from the battery or the power transmitted to the wheels by the motor, a signal for actuating the brakes, and a setpoint kinetic energy computed on the basis of the previous parameters. The expression instantaneous power is understood to mean energy per unit time, and the expression instantaneous energy is understood to mean energy per unit distance. The instantaneous excess energy, which by integration, makes it possible to compute a mean excess energy, can be taken equal to the instantaneous excess power divided by the speed of the vehicle.

In a preferential manner, the setpoint kinetic energy is computed by integrating the power provided to the wheels by the motor, and by imposing as bounds at each instant on the integral the zero value as lower bound and the total kinetic energy of the vehicle as upper bound.

According to a preferred mode of implementation, the instantaneous excess power comprises in particular a term dependent on the power dissipated in air-conditioning and/or in heating the vehicle.

According to an advantageous mode of implementation, the computation of the instantaneous excess power comprises one or more terms which are taken into account if and only if a value of kinetic energy recently accumulated by the vehicle exceeds a kinetic energy threshold. These terms are representative of the repercussions of a mode of driving with poor anticipation of slowdowns.

According to another mode of implementation which can be combined with the previous, the instantaneous excess power comprises one or more terms related to an excessive speed, which are taken into account if and only if the speed of the vehicle exceeds an optimal reference speed.

The instantaneous term related to an excessive speed of the vehicle can for example include a friction component in the form of a second-degree or third-degree polynomial in the speed of the vehicle.

The friction component can simultaneously be a second-degree or third-degree polynomial in a setpoint speed, which is the speed associated with the setpoint kinetic energy.

The term related to an excessive speed of the vehicle can also include an overspeed braking component, which is the product, times the efficiency of the motor, of a difference of terms, among which are counted the power transmitted to the wheels by the motor or the power delivered by the battery, the setpoint kinetic energy, and a resistance term which is dependent on the speed of the vehicle.

According to a particularly advantageous mode of implementation, the instantaneous excess power comprises a term related to a lack of anticipation in the driving of the vehicle, which is accounted for if and only if the vehicle, in a predefined time span preceding the instant of computation, has accumulated a quantity of kinetic energy greater than a kinetic energy threshold.

The computation of the term related to a lack of anticipation can involve an efficiency of the motor, a recuperative braking efficiency, the power drawn from the battery or the power transmitted to the wheels by the motor, the setpoint kinetic energy, and a resistance term which is dependent on the instantaneous speed of the vehicle.

It is possible to inform the driver of his instantaneous overconsumption with respect to the reference driving style, or/and it is possible to inform the driver of his mean overconsumption over a certain distance or over a certain journey time. The consumption or the instantaneous overconsumption can itself be a mean averaged over a lesser distance or duration than the distance or duration chosen for the computation of the mean overconsumption.

The previous computation of mean overconsumption can be for example performed by a first-degree filter, that is to say by computing a barycenter of the last estimated consumption or overconsumption value, and of the mean consumption or overconsumption value at the previous step. One does not stray from the field of the invention if the averaging operation is performed by the same procedure, directly on the value of power or energy consumed in the optimal running mode, instead of firstly being performed separately on the value of total power or energy of consumption and on the value of power or energy of overconsumption. Employing a first-degree filter makes it possible to limit the memory space required for computing the average.

According to another aspect, an automotive vehicle is equipped with a driving aid device configured to compute, on the basis of the actual energy consumption of the vehicle over a journey, an optimized consumption of the vehicle over the same journey corresponding to a reference driving style, and to inform the driver of the distance that he could travel with the energy reserve available aboard the vehicle if he adopted the reference driving style, or to inform the driver of the reduction in consumption that he could obtain by adapting his driving.

According to an advantageous embodiment, it is possible to compute a mean excess energy per unit distance traveled by integrating or by filtering over the distance traveled an instantaneous excess power divided by the instantaneous speed of the vehicle.

The invention will be better understood on reading the detailed description of an embodiment taken by way of wholly non-limiting example, and illustrated by the appended FIGURE, which represents in a simplified manner a driving aid device according to the invention.

Figure 1:
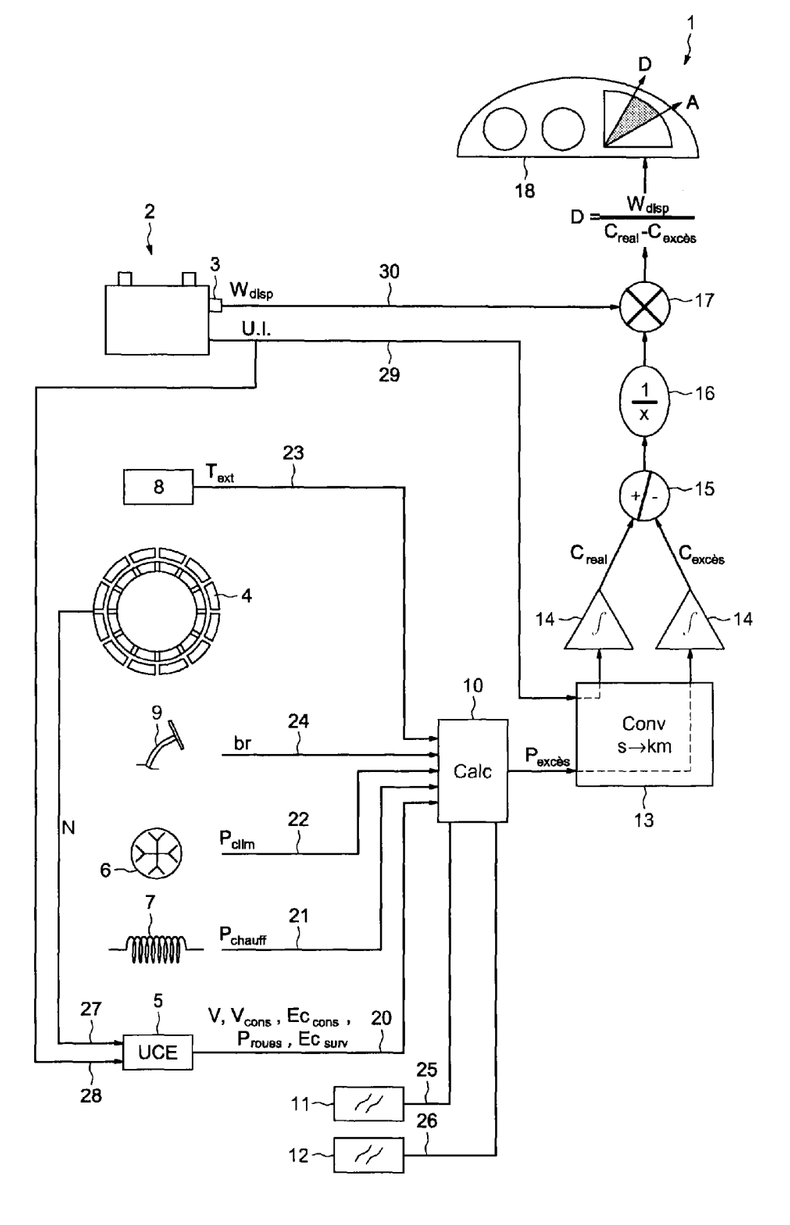

As illustrated in the FIGURE, a driving aid device 1 comprises a battery 2 equipped with a battery manager 3, an electric motor 4, an electronic control unit (ECU) 5, an air-conditioning system 6, a heating system 7, an exterior-temperature sensor 8, a brake pedal sensor 9, and an instantaneous excess power computer 10.

The device also comprises charts 11 and 12 linking respectively the exterior temperature of the vehicle to a maximum value of power to be consumed by the heating system and to a maximum value of power to be consumed by the air-conditioning system.

The device also comprises a display system 18, for example placed at the level of the dashboard, making it possible to display diverse information for the driver's attention, for example the power actually consumed at the level of the battery 2, the total energy available at the level of the battery 2, a residual range A that the vehicle can still travel with the energy reserve $W_{avail}$ of the battery 2, and an optimized range D representing the distance that the vehicle could still travel with the energy $W_{avail}$ available in the battery 2 if the driver followed a reference driving mode.

The reference driving mode can in particular consist in not using the heating 7 or the air-conditioning 6 beyond the power values advocated by the charts 11 and 12, in running at the maximum at a predefined optimal cruising speed which may for example be of the order of 90 km/hour, and in anticipating forthcoming obstacles, that is to say not accelerating the vehicle disproportionately if it will shortly be necessary to brake.

The device 1 furthermore comprises a converter 13, integrator filters 14, a subtracter 15, an inverter 16, a multiplier 17.

The computer 10 computes at each instant an instantaneous power that the vehicle draws from the battery, in excess with respect to what the vehicle would draw from the battery when performing the same journey while being driven according to the reference driving mode.

Accordingly, the computer 10 receives diverse information from various sensors of the vehicle, this information optionally being partially processed by the electronic control unit 5. Thus, the computer 10 receives through a connection 21 the instantaneous power consumed by the heating system 7, receives through a connection 22 the instantaneous power consumed by the air-conditioning system 6, receives through a connection 24 a signal "br" arising from the brake sensor 9 and indicating whether the brake pedal is actuated. The computer 10 receives through a connection 23 the exterior temperature value $T_{ext}$. With the aid of this temperature $T_{ext}$, it can fetch through connections 25 and 26, from the charts 11 and 12, the recommended maximum values of power consumed in heating and in air-conditioning, respectively $P_{heat\_max}$ and $P_{cond\_max}$. The electronic control unit 5 receives, through a connection 27 from a position sensor for the rotor of the motor 4, an item of information allowing it to compute the speed of rotation N of the motor 4. It also receives through a connection 28, from the battery manager 3, the value of instantaneous power of the battery corresponding to the product of the voltage across the terminals of the battery and the current entering the battery, U.I.

On the basis of these values, as well optionally as a scale-down ratio of a gearbox, the electronic control unit 5 computes an instantaneous speed V of the vehicle, a power $P_{wheels}$ corresponding to the power transmitted by the motor to actuate the wheels, or to the power at the wheels that is returned to the electric machine 4 in order to be transformed into electrical energy, a setpoint kinetic energy $Ek_{setp}$ representing a share of kinetic energy intentionally communicated to the vehicle by the driver, a setpoint speed $V_{setp}$ deduced from the previous kinetic energy, and a non-anticipation overspeed kinetic energy $Ek_{overs}$.

The ECU 5 dispatches all these values to the computer 10 which computes an excess power $P_{excess}$. This value of power is dispatched to the converter 13. The converter 13 converts the instantaneous excess power $P_{excess}$ into a value of energy consumed per unit distance traveled. This value per unit distance is thereafter filtered—or integrated—by one of the integrators 14, to deliver a mean excess consumption $C_{excess}$ per unit distance traveled.

The converter 13, which also receives the energy actually consumed by the battery 2, i.e. U×I, through a connection 29, also translates this instantaneous energy into an energy consumed per unit distance traveled, which it dispatches to another integrator 14. The latter delivers an energy per unit distance traveled actually consumed by the vehicle, i.e. $C_{real}$.

The real consumption $C_{real}$ is dispatched to a positive input of the subtracter 15, the excess consumption $C_{excess}$ is dispatched to a negative input of the subtracter 15, the result of the subtracter 15 being dispatched to an inverter 16 and then to a multiplier 17 which receives on one of its inputs, through a connection 30, the energy $W_{avail}$ still available in the battery 2.

At the output of the multiplier 17, a value D is obtained, representing the distance that the vehicle could travel if the driver were to adapt his mode of driving to the reference driving mode. The result is displayed by virtue of the display system 18.

In order to compute the power $P_{excess}$ consumed in excess by the vehicle, the computer 10 verifies in which span of values certain operating parameters of the vehicle are situated. Thus, by virtue of the chart 11, the computer 10 verifies whether the power consumed by the air-conditioning is greater than a value $P_{cond\_max}$, mapped in the chart 11 for the value $T_{ext}$ of exterior temperature measured.

If the power is greater than the advocated power $P_{cond\_max}$, the computer 10 adds to the value $P_{excess}$ a term air-conditioning excess=$P_{cond}-P_{cond\_max}$.

If the power consumed by the air-conditioning is less than the mapped threshold, the computer 10 does not add any term relating to the air-conditioning in the excess power term $P_{excess}$.

With the aid of the chart 12, the computer 10 proceeds in a similar manner for the power $P_{heat}$ consumed by the heating system 7. It thus computes, with the aid of the charts 11 and 12, an excess power term $P_{comf\_excess}$ related to the regulation of the thermal comfort of the cabin. By dividing $P_{comf\_excess}$ by the speed of the vehicle, the overconsumption is obtained per unit distance traveled, related to excessive use of the thermal comfort means. The terms contributing to the energy $\Delta E_{overcomf}$ of thermal overconsumption are summarized in table 1 hereinbelow:

TABLE 1

| values $\Delta E_{overcomf}$ | | |
|---|---|---|
| | $P_{heat} \leq P_{heat\_max}$ | $P_{heat} > P_{heat\_max}$ |
| $P_{cond} \leq P_{cond\_max}$ | 0 | $(P_{heat} - P_{heat\_max}) \times \frac{1}{V}$ |
| $P_{cond} > P_{cond\_max}$ | $(P_{cond} - P_{cond\_max}) \times \frac{1}{V}$ | $(P_{heat} - P_{heat\_max}) \times \frac{1}{V} +$ $(P_{cond} - P_{cond\_max}) \times \frac{1}{V}$ |

Of course the particular case represented by the last box in the bottom right of the table should never normally occur, since it would correspond to simultaneous use of the air-conditioning and of the heating.

The computer 10 also computes an excess energy term $\Delta E_{pace}$, which is added to the previous term $\Delta E_{overcomf}$ in the estimation of the energy $E_{excess}$ consumed in excess with respect to the reference driving mode. $\Delta E_{pace}$ depends on the pace of the vehicle, that is to say its instantaneous speed and its recent speed history.

The aim of this term $\Delta E_{pace}$ is to highlight the influence of a speed which would be too high on average, as well as the influence of a lack of anticipation, the lack of anticipation being manifested by variations in speed whose amplitude is too high with respect to the temporal spread of these variations.

Accordingly the computer 10 compares the instantaneous speed with one or more threshold speeds, for example a first threshold speed $V_1$ and a second threshold speed $V_{eco}$.

In parallel, the computer 10 also verifies the value attained by a value $Ek_{overs}$ dimensionally equivalent to a kinetic energy, and which reflects a quantity of kinetic energy accumulated over a time interval preceding the current instant.

A kinetic energy value $Ek_{overs}$ greater than a threshold—threshold equal to zero in the embodiment illustrated—can thus represent the fact that the driver has requested too significant an acceleration from the vehicle. The vehicle then possesses a kinetic energy "of recent date" that has not yet waned at the moment at which the driver decelerates again.

Table 2 summarizes a possible way of accounting for the terms contributing to the energy per km $\Delta E_{pace}$ consumed in excess with respect to a reference driving mode. In accordance with the vehicle speed domain V and in accordance with its kinetic energy history characterized by the value $Ek_{overs}$, the energy $\Delta E_{pace}$ comprises a term $E_{RT}$ corresponding to an energy that has performed an irrelevant return trip from the battery to the wheels, a term $E_{brake}$ of energy dissipated in the brakes, and a term $E_{aero}$ representing the excess of aerodynamic frictional energy dissipated with respect to a running at moderate speed (speed less than or equal to $V_{eco}$).

TABLE 2

| values $\Delta E_{pace}$ | | |
|---|---|---|
| | $V \leq V_1$ | $V_1 < V \leq V_{eco}$ | $V > V_{eco}$ |
| $Ek_{overs} = 0$ | 0 | $E_{brake}$ | $E_{aero} + E_{brake}$ |
| $Ek_{overs} > 0$ | $E_{RT} + E_{brake}$ | $E_{RT} + E_{brake}$ | $E_{RT} + E_{aero} + E_{brake}$ |

If the kinetic energy $Ek_{overs}$ representing the lack of anticipation is less than or equal to the chosen threshold, this corresponding to the second row of table 2:

no excess term related to the pace is accounted for if the instantaneous speed of the vehicle is less than a first speed $V_1$. $V_1$ corresponds to a minimum speed necessary for the vehicle handling and parking maneuvers, for example a speed of 10 km/hour.

if the speed V of the vehicle is greater than the first threshold speed $V_1$, the computer 10 takes into account a first excessive dissipation term $E_{brake}$ corresponding to an energy dissipated because of the frictional braking. This energy $E_{brake}$ could for example have been avoided by running less quickly, or by braking with the motor brake.

if the instantaneous speed of the vehicle is greater than a threshold speed $V_{eco}$, the computer 10 furthermore accounts for an excess term related to the frictional forward progress dissipations. This excess term can comprise a term $E_{bear}$ representing the friction of the bearings of the vehicle wheels, as well as a term $E_{aero}$ of aerodynamic losses related to the vehicle resistance to forward progress through the air. For order of magnitude reasons, in the embodiment described, it is considered that the term regarding excess power dissipated by friction is substantially equal to the power related to the aerodynamic losses, and the contribution of the bearing friction is disregarded. One would not stray from the framework of the invention by also accounting for a term $E_{bear}$ representing the friction of the bearings of the wheels of the vehicle.

In the case where the overspeed kinetic energy $Ek_{overs}$ is greater than the chosen threshold—here 0—, this corresponding to the third row of table 2:

the computer 10 adds to the excess energy term a value $E_{RT}$ related to the losses of energy by return trip of the energy drawn from the battery, dispatched to the wheels, and then recovered, in part only, by means of the recuperative braking, the computer 10 also adds to the excess power term $E_{excess}$ a contribution $E_{brake}$ accounting for the energy possibly dissipated by braking, if the instantaneous speed of the vehicle is furthermore greater than the threshold speed $V_{eco}$, the computer 10 also accounts for an excess term $E_{aero}$ related to the frictional forward progress dissipations.

To obtain the value of excess energy consumed by the vehicle, the terms of table 1 and the terms of table 2 are added, these corresponding to the current configuration of the vehicle as regards regulation of comfort and the pace of forward progress of the vehicle.

The way in which the various contribution terms indicated in table 2 are computed is described in what follows.

On the basis of the energy value $U \times I$ transmitted by the battery manager 3, the electronic control unit 5 computes a power at the wheels $P_{wheels}$ in the following manner:

$$P_{wheels} = UI/Rdt_{mot} \text{ if } UI \geq 0$$

$$P_{wheels} = UI/Rdt_{gen} \text{ if } UI < 0 \quad \text{(Equation 1)}$$

where:

$Rdt_{mot}$, the efficiency "of motor operation", is a value greater than 1, which can be taken constant or which can be mapped as a function of the speed of rotation of the motor 4, $Rdt_{gen}$, the efficiency "of generator operation", is a value less than or equal to 1 which can be considered to be constant or which can also be mapped as a function of the speed of rotation of the motor 4.

Efficiency of the motor and Efficiency of the generator are therefore two values or two charts stored by the control unit 5. The power $P_{wheels}$ makes it possible to ascertain at each instant the mechanical power received at the level of the drive wheels of the vehicle. This power is used in particular to compute a setpoint kinetic energy $E_{ksetp}$, which corresponds to a kinetic energy induced by the regulation that the driver performs at the level of the acceleration pedal. This setpoint kinetic energy avoids having to account for the influence of the speed variations related, for example, to the forces of gravity, when the vehicle is traveling on a road with a slope.

It is chosen to compute this setpoint kinetic energy $Ek_{setp}$ in an iterative manner, at an instant $t+\delta t$, on the basis of the kinetic energy corresponding to the previous instant t in the following manner:

$$0 \leq Ec_{setp} \leq \frac{1}{2}MV^2$$

M is the mass of the vehicle and V is the instantaneous speed of the vehicle.

As a first approximation, it is possible to choose as mass of the vehicle a mean mass of the vehicle lightly loaded, with two passengers for example.

The power at the wheels $P_{wheels}$ is also used to compute a so-called "non-anticipation overspeed" kinetic energy $Ek_{overs}$. It is for example possible to define $Ek_{overs}$ in the following manner:

$$Ek_{overs}(t+\delta t) = Ek_{setp}(t) + Ek_{overs}(t)\left(1 - \frac{\delta t}{\tau}\right) \quad \text{(Equation 3)}$$

By taking for example as initial value $Ek_{overs}=0$ at the moment at which the driver of the vehicle reinitializes the counter of the dashboard.

$\delta t$ is the interval of the computation time separating the previous measurement of the wheels and the current measurement of $P_{wheels}$.

$\tau$ is a damping time constant chosen for example equal to a value which can be a constant lying between four and eight seconds.

If the power $Ek_{setp}(t)$ provided to the wheels is zero for a duration of the order of $\tau$, the residual value of $Ek_{overs}$ becomes very small.

There is thus an effect of forgetting the kinetic energy stored up over a period $\tau$.

On the other hand, the kinetic energy $Ek_{overs}$ continues to grow as long as $Ek_{setp}(t)$ increases.

Here the power at the wheels is accounted for only when it is positive, that is to say when the electric machine 4 operates as propulsion motor.

To compute the energy $E_{brake}$ dissipated in the brakes, the computer 10 firstly verifies whether the sensor 8 indicates that the brake is actuated. If the brake is not actuated, no braking power is accounted for; if the brake is actuated, the braking power $P_{brake}$ is estimated on the basis of the following dynamics equation:

$$P_{brake} + P_{grav} + P_{fric} + P_{wheels} = MV\frac{dV}{dt} \text{ if } br = \text{true} \quad \text{(Equation 4)}$$

where:

$P_{fric}$ is the power of the friction forces other than the forces of the brakes, $P_{grav}$ is the power of the gravitation forces, and $P_{wheels}$ is the power delivered to the wheels.

To alleviate the inaccuracies in estimating the dissipation power of the friction forces $P_{fric}$, and the difficulty in computing the powers $P_{grav}$ related to the gravitation forces—requiring information on the slope of the road on which the vehicle is traveling —, the total kinetic energy variation term $$MV\frac{dV}{dt}$$

is substitute in equation 4 with a setpoint kinetic energy variation $$\frac{d(Ek_{setp})}{dt}$$

where $Ek_{setp}$ is the setpoint kinetic energy defined above, i.e.:

$$P_{brake} = -P_{fric} - P_{wheels} + \frac{d(Ek_{setp})}{dt} \quad \text{(equation 4bis)}$$

This therefore avoids having to obtain for example a positive braking power estimation—so doing the vehicle—.

Equations 4 and 4bis are equivalent on flat road. The estimation obtained through equation 4 bis remains consistent on hilly road. This mode of computation can lead to a slight overestimation of the braking forces if the vehicle is climbing, but the use of the brakes is rare in this particular case.

According to the variant embodiments, it is possible to replace this mode of estimation by a direct evaluation of the power dissipated by braking, as a function of the bearing force on the brakes. This mode of evaluation is in particular possible if the vehicle is equipped with a hydraulic braking system instrumented to measure the braking force. It is then possible, on the basis of the estimations of the pressure sensor, to get back to an estimation of the braking torque, and obtain the braking power by multiplying this torque by the angular speed of the wheels.

To estimate the power $P_{fric}$ of the friction forces other than the friction forces of the brakes, it is considered that the main components of these friction forces comprise:
- the power of aerodynamic braking forces,
- and the power of the friction forces of the bearings of the wheels of the vehicle.

i.e.:

$$P_{fric} = P_{aero} + P_{bear} \quad \text{(Equation 5)}$$

The power $P_{bear}$ dissipated in the bearings can, as a first approximation, be written in the form:

$$P_{bear} = -bV \quad \text{(Equation 6)}$$

where b is a constant arising from the so-called Hoerner formula, and which is equal to:

$$b = M\left(\alpha + \frac{\beta}{\Pi_{Tires}}\right) \quad \text{(Equation 7)}$$

where M is the mass of the vehicle, $\alpha$ and $\beta$ are constants and $\pi_{tires}$ is the inflation pressure of the tires of the vehicle.

The power dissipated by the aerodynamic friction forces $P_{aero}$ can as a first approximation be considered to be equal to:

$$P_{aero} = -aV^3 \quad \text{(Equation 8)}$$

where a is a constant dependent on the density $\rho$ of the air and an aerodynamic coefficient SCx of the vehicle, in the form:

$$a = \tfrac{1}{2}\rho SCx \quad \text{(Equation 9)}$$

It is therefore possible to estimate the braking power in the following form:

$$P_{brake} = \frac{dEk_{setp}}{dt} - P_{wheels} + aV^3 + bV$$

The overconsumption brought about by the braking power $P_{brake}$ is equal to a value of overconsumption at the level of the battery, and which is:

$$P_{brake}^{bat} = P_{brake} \times Rdt_{mot}$$

And the energy "wasted" in braking per unit distance traveled equals $$\boxed{E_{brake} = \frac{1}{V} \times P_{brake} \times Rdt_{mot} = \frac{1}{V} \times \left(\frac{dEk_{setp}}{dt} - P_{wheels}\right) + aV^2 + b, \text{ if } br = \text{true}} \quad \text{(Equation 10)}$$

where V is the speed of the vehicle, and the logical variable "br" indicates that the dissipative brake is actuated.

The power $P_{RT}$ of losses by return trips of energy from the battery to the wheels and then back to the battery, equals:

$$P_{RT} = -P_{wheels} \times (Rdt_{mot} - Rdt_{gen}) \quad \text{(Equation 11)}$$

Indeed, unit power afforded to the wheels "costs" a power $Rdt_{mot}$ in order to be provided to the wheels and only a proportion thereof equal to $Rdt_{gen}$ is recovered thereafter.

The corresponding energy per unit distance traveled is therefore equal to $$\boxed{E_{RT} = \frac{P_{RT}}{V} = -\frac{P_{wheels}}{V} \times (Rdt_{mot} - Rdt_{gen}) \text{ if } P_{wheels} > 0} \quad \text{(Equ 12)}$$

where V is the speed of the vehicle.

According to the variant embodiments, it is possible to compute the energy lost by return trip, not on the basis of the total power $P_{wheels}$ provided to the wheels, but of a power increment $\Delta P_{wheels}$ provided so as to go from a "reasonable" speed (for example $V_{eco}$) to the current speed $V > V_{eco}$.

As regards the energy overconsumed by reason of the aerodynamic friction forces $E_{aero}$, it is desired to account in a different manner for:
- the losses related to the speed induced by the driver by depressing the acceleration pedal,
- and the losses induced by a speed possibly not induced by the driver and related for example to a speed adopted during a phase of vehicle descent on a sloping road.

Furthermore, it is not desired to account for the energy which would anyway be dissipated within the framework of a "reference" running of the vehicle. The reasoning is based on the aerodynamic energies dissipated which are obtained by multiplying the aerodynamic powers dissipated by the corresponding speeds of the vehicle, i.e.:

$$E_{aero\_tot} = \frac{1}{V} P_{aero} = -aV^2 \quad \text{(Equation 13)}$$

$E_{aero\_tot}$ is the total aerodynamic energy dissipated per unit distance traveled of the vehicle, $$\Delta E_{aero\_tot} = -a(V^2 - V_{eco}^2) \quad \text{if } V \geq V_{eco}$$
$$\Delta E_{aero\_tot} = 0 \quad \text{if } V < V_{eco}$$

where $\Delta E_{aero\_tot}$ is the aerodynamic frictional energy excess dissipated with respect to a mode of reference running at a speed equal to the speed $V_{eco}$, $$\Delta E_{aero\_setp} = -a(V_{setp}^2 - V_{eco}^2) \quad \text{if } V_{setp} \geq V_{eco}$$
$$\Delta E_{aero\_setp} = 0 \quad \text{if } V_{setp} < V_{eco}$$

if $V_{setp} < V_{eco}$ where $\Delta E_{aero\_setp}$ is the energy excess per unit distance, with respect to the mode of reference running at the speed $V_{eco}$, induced directly by the driver's actions on the acceleration pedal.

By taking account of the efficiencies in motor mode of operation and in generator mode of operation of the electric machine 4, it is considered that the aerodynamic losses comprise:

- a share of energy lost in a deliberate manner by reason of the mode of driving of the driver corresponding to an energy that has been provided in excess to maintain an excessive speed; a motor efficiency is therefore applied to this share of energy to estimate the corresponding energy dissipated at the level of the battery,
- an "unintentional" share of energy lost by reason of the aerodynamic friction, which is not an energy deliberately provided in excess, but if this energy had not been dissipated by friction it might have been recovered in regenerative braking mode, therefore a generator efficiency is applied to it.

The energy excess $E_{aero}$ dissipated by reason of the aerodynamic friction is therefore expressed in the following form:

$$E_{aero} = \Delta E_{aero\_setp} \times Rdt_{mot} + (\mu E_{aero\_tot} - \Delta E_{aero\_setp}) \times Rdt_{gen})$$

$$E_{aero} = -a(V_{setp}^2 - V_{eco}^2) \times Rdt_{mot} - a(V^2 - V_{setp}^2) \times Rdt_{gen} \quad \text{(Equation 14)}$$

Once the computation unit 10 has determined the terms of tables 1 and 2 to be taken into account, it sums them to obtain a value $E_{excess} = \Delta E_{overcomf} + \Delta E_{pace}$ representing the excess energy consumed per unit distance traveled.

According to a variant embodiment, the computation of the various overconsumption terms can be performed in the form of powers initially, so as to deliver an instantaneous value of excess power which is thereafter converted into excess energy per unit distance. It is this embodiment which is represented in the FIGURE.

The instantaneous overconsumption energy is thereafter filtered to obtain a short-term, medium-term or long-term mean overconsumption $C_{excess}$. In parallel, the energy U×I actually tapped off from the battery is filtered to obtain a short-term, medium-term or long-term mean consumption $C_{real}$.

It is optionally possible to perform several types of filterings so as to advise the driver both as regards his mean overconsumption, for example on the scale of a hundred kilometers, and as regards his recent overconsumption, for example over a scale of ten kilometers. The latter scale allows him to take note of the effects of a possible recent modification of his driving style.

The filtering can be performed by a sliding average, or, in order to limit the necessary memory space, by a $1^{st}$-order filter. The $1^{st}$-order filter consists in computing a barycenter between the last overconsumption value estimated and the mean overconsumption value estimated at the previous computation step.

It is possible to apply the filtering directly to the value of "optimized" consumption $E_{eco}$, which is equal to:

$$E_{eco} = UI + \Delta E_{pace} + \Delta E_{overcomf}$$

$\Delta E_{pace}$ et $\Delta E_{overcomf}$ being, with the above notational conventions, defined to be negative. In the case where the filtering is applied directly to the optimized consumption energy, the filtering by a first-order filter can for example be applied according to a formula of the type:

$$E_{eco\_avg}(t + \delta t) = \left(1 - V\frac{\delta t}{\Delta L}\right) E_{eco\_avg}(t) + \frac{V \delta t}{\Delta L} E_{eco}(t) \quad (15)$$

where:

$E_{eco\_avg}(t+\delta t)$ is the filtered value at the instant $t+\delta t$,
$E_{eco\_avg}(t)$ is the filtered value at the previous computation instant t,
V is the speed of the vehicle,
$\delta t$ is the time interval between two computation steps, and
$\Delta L$ is a filtering interval, which may for example be of the order of 10 km for short-term filtering, and of the order of a hundred km for long-term filtering.

According to the variant embodiments, it is possible to choose to display, on the display system 18, two values to be compared, such as on the one hand, the range A corresponding to the current mode of driving of the vehicle, and on the other hand the "optimized" range D corresponding to the reference driving mode.

It is also possible to display in parallel the instantaneous consumption per kilometer of the vehicle and the "optimized" instantaneous or averaged consumption, that the driver could obtain by modifying his driving style. It is also possible to choose to display the real consumption in parallel with the overconsumption, that the driver should endeavor to make tend to 0.

The display can be performed either as an absolute value, for example in kilowatt.hours per kilometer, or as a relative value, for example by displaying the percentage of the current consumption that the driver could save by modifying his driving style. The display can also differentiate the origin of the overconsumptions: from thermal comfort, lack of anticipation or overspeed.

The invention thus allows the driver to evaluate the effectiveness of his driving style and to test the influence of a modification of driving style on the indicators displayed.

The device requires only the information collected by the sensors on board the vehicle, without resorting to exterior databases relating to the topology of the roads to be traveled, whether these databases are preloaded or available through wireless links.

The computer 10 needs only a restricted amount of information, which is information customarily available on the vehicle for other monitoring purposes. The computation algorithm used is very simple and rather frugal in terms of memory resources. The precision obtained in the estimation of the potential range of the vehicle and in the estimation of the instantaneous overconsumption or of the mean overconsumption is sufficient to allow the driver to adapt his driving style in a relevant manner.

The subject of the invention is not limited to the exemplary embodiments described and can take the form of numerous variants. For example the filtering used to obtain the mean excess energy can be a $1^{st}$-order filter, can be a sliding average over a certain duration or a certain distance traveled, or yet another type of filter. Variations are possible in the formulae employed to estimate the dissipative frictional losses or the aerodynamic losses. The conversion of the various overconsumption components, to transform the instantaneous powers into overconsumptions per unit distance, can be done at various stages of the computation.

Thus, when the energy dissipated in excess by the aerodynamic friction is accounted for, the computations may reveal a second-degree or third-degree polynomial in the speed of the vehicle, depending on whether the breakdown is done in terms of energy per kilometer or in terms of instantaneous power.

The filtering to obtain a short-term or longer-term mean overconsumption can be done, according to the embodiments, either with respect to time, or with respect to distance traveled.

It is possible to account for all the excess overconsumption terms in the form of instantaneous power, and to recompute only at the end, values per kilometer of energy consumed and of excess energy consumed.

It is also possible to take into account the consumption excesses in the form of energy per kilometer right from the first steps of the computation, as is proposed above for the computation of the excess energy of the aerodynamic friction forces.

The results of the computations might be slightly different according to the two procedures, while remaining globally valid. Thus, if the reasoning in terms of power is done first, the power $P_{eco}$ theoretically consumed with the reference driving mode will be equal to the difference between the power U.I actually consumed and the sum of the two overconsumption powers $\Delta P_{pace}$ and $\Delta P_{overcomf}$.

The energy consumed per kilometer $E_{eco}$ will be deduced with the aid of the speed at which this vehicle runs in economical mode, of the previous power $P_{eco}$, according to the formula $$E_{eco} = \frac{P_{eco}}{V_{eco}},$$

since it is necessary to take into account the speed at which the vehicle runs in economical mode.

If it is desired to perform the reasoning upstream as a function of the energies consumed per kilometer, the energy $E_{eco}$ will be equal to the energy actually consumed by the vehicle per kilometer, that is to say $$\frac{U \cdot I}{V},$$

from which energy are subtracted the overconsumption terms related to the pace and to the thermal overcomfort. An expression of the form $$E_{eco} = \frac{U \cdot I}{V} + \frac{\Delta E_{pace}}{V} + \frac{\Delta E_{overcomf}}{V}$$

is then obtained. The U.I. term will therefore be normalized by a different speed V from that used in the previous mode of computation, where this same term is normalized by $V_{eco}$.

According to the type of modeling adopted, the formulae used to compute the various overconsumption terms related to the pace of the vehicle can therefore differ from one embodiment to another, for example be deduced from one another via a ratio $$\frac{V}{V_{eco}}.$$

The computer 10 is still able to evaluate the overconsumption related to the pace of the vehicle or to the variations in pace of the vehicle, on the basis of a restricted amount of data, among which are the power actually consumed by the battery U.I, the speed and the speed history of the vehicle, an item of information making it possible to know whether a dissipative brake is actuated, and an item of information making it possible to know whether the electric machine 4 is operating as motor or as generator.

The device for aiding the optimization of driving is therefore simple and inexpensive to carry out, and can make it possible to improve the range of the vehicle if the driver uses the information given to him.

The invention claimed is:

1. A method for aiding driving of an automotive vehicle including at least one electric motor supplied by a battery and configured to propel drive wheels of the vehicle, the method comprising:
    computing an optimized consumption of the vehicle over a same journey as the vehicle is in the process of making on the basis of actual energy consumption of the vehicle and of values collected by sensors of the vehicle, the optimized consumption corresponding to a reference driving style;
    informing the driver of the distance the vehicle could travel with energy reserve available aboard the vehicle if the driver adopted a reference driving style, or else the driver is informed of energy saving per unit distance traveled that the vehicle could achieve if the driver adopted the reference driving style;
    computing an overconsumption or mean excess energy consumed in excess by the vehicle over a time period or over a predefined journey length; and
    computing an optimized consumption by subtracting the mean excess energy from the energy actually consumed by the vehicle.

2. The method for aiding driving as claimed in claim 1, further comprising determining an instantaneous excess power or energy on the basis of which is computed the mean excess energy, the instantaneous excess power or energy being computed on the basis of parameters including instantaneous speed of the vehicle, power drawn from the battery or power transmitted to the wheels by the motor, a signal for actuating brakes of the vehicle, and a setpoint kinetic energy computed on the basis of the previous parameters.

3. The method for aiding driving as claimed in claim 2, further comprising computing the setpoint kinetic energy by integrating the power provided to the wheels by the motor, and by imposing as bounds at each instant on the integral the zero value as lower bound and total kinetic energy of the vehicle as upper bound.

4. The method for aiding driving as claimed in claim 2, in which the instantaneous excess power further includes a term dependent on power dissipated in air-conditioning and/or in heating the vehicle.

5. The method for aiding driving as claimed in claim 2, in which the computing the instantaneous excess power includes one or more terms which are taken into account if and only if a value of kinetic energy recently accumulated by the vehicle exceeds a kinetic energy threshold.

6. The method for aiding driving as claimed in claim 2, in which the instantaneous excess power includes one or more terms related to an excessive speed, which are taken into account if and only if the speed of the vehicle exceeds an optimal reference speed.

7. The method for aiding driving as claimed in claim 6, in which the instantaneous term related to an excessive speed of the vehicle includes a friction component in a form of a second-degree or third-degree polynomial in the speed of the vehicle.

8. The method for aiding driving as claimed in claim 7, in which the term related to an excessive speed of the vehicle also includes a second-degree or third-degree polynomial in a setpoint speed, which is a speed associated with a setpoint kinetic energy.

9. The method for aiding driving as claimed in claim 6, in which the term related to an excessive speed of the vehicle includes an overspeed braking component, which is the product, times the efficiency of the motor, of a difference of terms, among which are counted the power transmitted to the wheels by the motor or the power delivered by the battery, a setpoint kinetic energy, and a resistance term which is dependent on the speed of the vehicle.

10. The method for aiding driving as claimed in claim 2, in which the instantaneous excess power comprises a term related to a lack of anticipation in the driving of the vehicle, which is accounted for if and only if the vehicle, in a predefined time span preceding the instant of computation, has accumulated a quantity of kinetic energy greater than a kinetic energy threshold.

11. The method for aiding driving as claimed in claim 10, in which the term related to a lack of anticipation involves an efficiency of the motor, a recuperative braking efficiency, the power drawn from the battery or the power transmitted to the wheels by the motor, a setpoint kinetic energy, and a resistance term which is dependent on the instantaneous speed of the vehicle.

12. The method as claimed in claim 1, in which the driver is informed of his/her instantaneous overconsumption with respect to the reference driving style, or/and in which the driver is informed of his/her mean overconsumption over a certain distance or over a certain journey time.

13. The method as claimed in claim 1, in which the computation of mean overconsumption is performed by a first-degree filter, by computing a barycenter of a last estimated overconsumption value, and of mean overconsumption value at a previous step.

14. An electric propulsion automotive vehicle comprising:
a driving aid device configured to compute, on the basis of an actual energy consumption of the vehicle over a journey, an optimized consumption of the vehicle over a same journey corresponding to a reference driving style, wherein the device for aiding driving is configured to inform the driver of the distance that the vehicle could travel with an energy reserve available aboard the vehicle if the driver adopted the reference driving style, or to inform the driver of a reduction in consumption that the vehicle could obtain by adapting the driver's driving; and means for computing, over a time period or over a predefined journey length, an overconsumption or mean excess energy consumed in excess by the vehicle, and means for computing an optimized consumption by subtracting the mean excess energy from the energy actually consumed by the vehicle.

* * * * *